O. O. OZIAS.
CHEESE CUTTER.
APPLICATION FILED JAN. 7, 1909.
934,208.
Patented Sept. 14, 1909.
2 SHEETS—SHEET 1.
Fig -1-
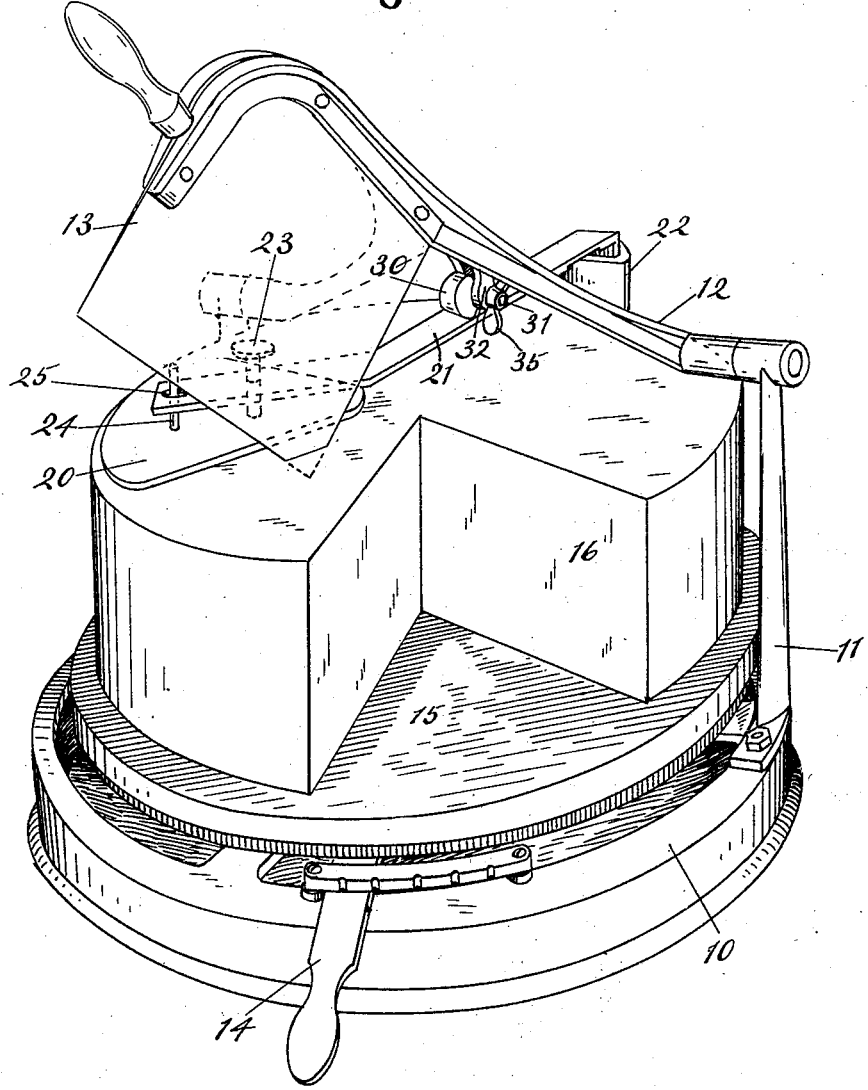
Fig -2-
WITNESSES:
W. M. Gentle.
O. M. McLaughlin
INVENTOR.
Orange O. Ozias.
BY
V. H. Lockwood.
ATTORNEY.

O. O. OZIAS.
CHEESE CUTTER.
APPLICATION FILED JAN. 7, 1909.
934,208.
Patented Sept. 14, 1909.
2 SHEETS—SHEET 2.
Fig-3-
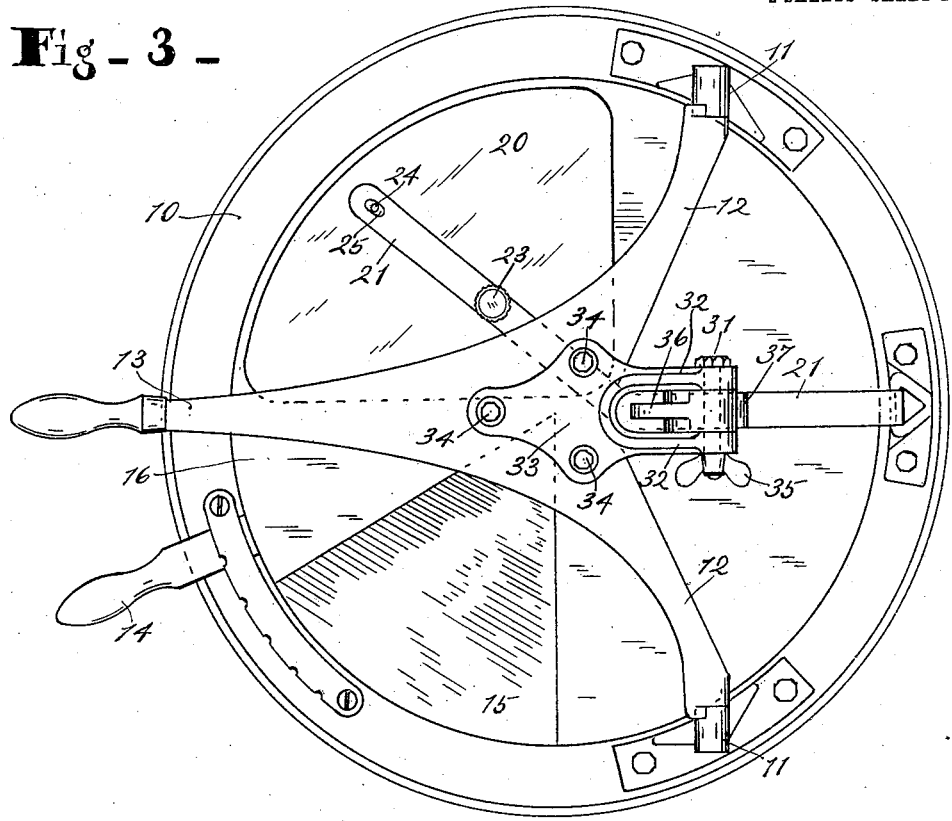
Fig-4-
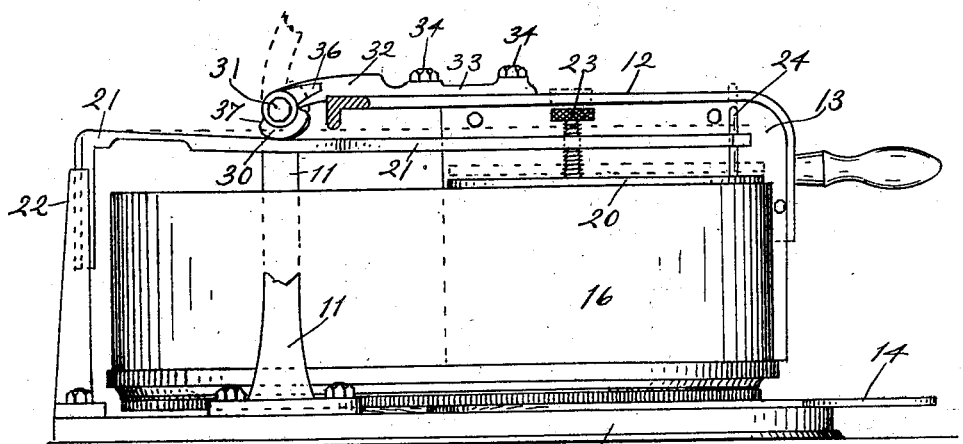
WITNESSES:
W. M. Gentle.
O. M. McLaughlin.
INVENTOR.
Orange O. Ozias.
BY
V. H. Lockwood
ATTORNEY.

UNITED STATES PATENT OFFICE.

ORANGE O. OZIAS, OF DAYTON, OHIO.

CHEESE-CUTTER.

934,208.  Specification of Letters Patent.  Patented Sept. 14, 1909.

Application filed January 7, 1909. Serial No. 471,053.

*To all whom it may concern:*

Be it known that I, ORANGE O. OZIAS, of Dayton, county of Montgomery, and State of Ohio, have invented a certain new and useful Cheese-Cutter; and I do hereby declare that the following is a full, clear, and exact description thereof, reference being had to the acompanying drawings, in which like numerals refer to like parts.

The object of this invention is to provide means for holding the cheese on a cheese cutter from movement when desired and of such character as to render the cheese cutter thoroughly sanitary.

Heretofore it has been quite common for the cheese supporting table to be formed of wood and to contain embedded therein radially disposed upwardly extending metal plates or lugs that projected into the cheese, for the purpose of holding the cheese on the table while the same was being sliced, and preventing the movement of the cheese on the table. There has been usually five or more of these cheese holding plates, and the result has been that said plates or lugs injured five or more slices or portions of each cheese placed upon the table of the cheese cutter, so that said five or more slices or portions cannot be sold and become waste, and said plates or lugs caused a blackening, soiling and a partial decay of said slices or portions.

The object of my invention is to avoid the loss above set forth and to enable the cheese to be held from rotary movement without anything penetrating the same, and also to enable a glass, marble, or other sanitary table to be used on cheese cutter.

The chief feature of my invention consists in a plate adapted to press against the external surface of the cheese and prevent its movement without penetrating or injuring the cheese.

The full nature of this invention will be understood from the accompanying drawings, and the following description and claims:

In the drawings Figure 1 is a perspective view of a cheese cutter provided with said improvement and showing a cheese thereon partially cut away and with a knife in process of cutting another slice or portion. Fig. 2 is simply a vertical section from the cheese board or table. Fig. 3 is a plan view of the cheese cutter with the knife down and a portion cut. Fig. 4 is a side elevation of the cheese cutter, the knife frame being shown partly broken away and partly in section.

It is immaterial as to the particular style, type or sort of cheese cutter with which my invention may be combined or associated. I herein show a cheese cutter of usual type having a base 10 with standards 11 on which knife frame 12 of the knife 13 is mounted. 14 is the hand lever for actuating the cheese supporting table 15 on which a cheese 16 is placed. The table 15 is preferably made of glass, marble or other sanitary material that is easily kept clean, and it is provided with no means for penetrating the cheese, but has a smooth upper surface upon which the cheese merely rests.

The cheese is held in place while being sliced by the cheese holding plate 20 that is mounted on the end of the spring arm 21, which projects horizontally and centrally under the knife frame from the standard 22 on the rear part of the base. Said standard 22 is vertically recessed to receive the downwardly extending shank at the end of the rear arm 21. The plate 20 is mounted in connection with the arm 21 by a screw bolt 23 that screws through the arm 21 and is secured to the lower arm of the plate 20 and has a knurled head for its manipulation. There is also a guide pin 24 extending upwardly from the plate 20 and loosely through a hole 25 in the arm 21. The plate 20 is preferably flat and horizontal so as to rest upon the upper surface of the cheese holding plate and arm and is depressed by a vertical cam 30 mounted on a horizontal bolt 31 and between two parallel rearwardly extending arms 32 of a bracket or frame 33 which is secured by a bolt 24 upon the knife frame. The bolt 31 has a wing nut 35 to clamp the cam between the arm 32 and the bracket 33. The cam has a handle-like projection 36 whereby the cam can be turned for adjustment. During such adjustment the wing nut is loosened.

The cam has a rear surface 37 that is vertical when the knife frame is down and substantially horizontal when the knife frame is up. The cam surface leads from said rear surface at first abruptly, and then increases very slightly so that when the knife frame is thrown to its upward position, the cam will entirely disengage the arm 21. Soon after the knife is started to its downward movement, the abrupt beginning of the cam surface engages the arm 21 and rather suddenly depresses the plate 20 upon the cheese. Then as the knife is further depressed for cutting the slice, the cam very gradually increases its depressing action on the arm 21 and the plate 20. The result is that while the knife is cutting the cheese and being elevated, the cheese will be held securely on the table, but when the knife is in its elevated position the plate 20 will be lifted up away from the cheese by a spring arm 21 and permit the slight rotary movement of the cheese on the table in position for cutting the next portion. Therefore the plate is mounted on the spring arm in position to be immediately over the cheese, and preferably so that said spring arm and plate will be engaged and depressed by the knife frame and means connected therewith, as the knife is depressed for cutting a slice or portion. With this arrangement the cheese will be held tightly in place after the downward movement of the knife has commenced and while the slice or portion is being severed. But when the knife is elevated the cheese holding plate will be released to permit the cheese to be rotated, for another slice or portion to be cut. Along with the foregoing is means for mounting said cheese holding plate and the arm so that it will be readily adjusted to accommodate it readily, to cheese varying in thickness.

What I claim as my invention and desire to secure by Letters Patent is:

1. The combination of a frame of a cheese cutter, a rotary cheese table mounted thereon, a flat surfaced plate substantially quadrant-shaped adapted to engage the top surface of the cheese at one side of the center thereof, and means for disengaging the plate from the cheese if desired.

2. The combination with a frame of a cheese cutter, a movable cheese table mounted thereon, and movable cutting means mounted in connection with said frame, of means for holding the cheese from movement which is controlled by said cutting means.

3. The combination with the frame of a cheese cutter, a movable cheese table mounted thereon, and a knife frame mounted in connection with the frame of the cheese cutter, of means for engaging the cheese and holding it from movement and which is actuated and held in position by said knife frame.

4. The combination with the frame of a cheese cutter, a movable cheese table mounted thereon, and a knife frame mounted in connection with the frame of the cheese cutter, of a cheese holding plate adapted to engage the upper surface of a cheese, and a spring arm on which said plate is mounted, which spring arm is located so as to be engaged by the knife frame and depressed as the knife frame is moved downwardly for cutting the cheese, whereby said plate will hold the cheese while a slice is being severed, but will disengage the cheese when the knife frame is elevated to permit further movement of the cheese.

5. The combination with the frame of a cheese cutter, a movable cheese table mounted thereon, and a knife frame mounted in connection with the frame of the cheese cutter, of a plate adapted to hold the upper surface of the cheese, a horizontally disposed spring arm on one end of which said plate is mounted, said spring arm being arranged to normally hold said plate in an elevated disengaging position, and means in connection with the knife frame adapted to gradually engage and depress said arm as the knife frame is moved downwardly, and which disengages said arm when the knife frame is in its upward position.

6. The combination with the frame of a cheese cutter, and movable cheese table mounted thereon, and a knife frame mounted in connection with the frame of the cheese cutter, and a plate adapted to hold the upper surface of the cheese, a horizontally disposed spring arm on one end of which said plate is mounted, said spring arm being arranged to normally hold said plate in an elevated, disengaging-position, and a cam mounted in connection with said knife frame for gradually engaging and depressing said arm.

7. The combination with the frame of the cheese cutter, and a movable cheese table mounted thereon, and a knife frame mounted in connection with the frame of the cheese cutter, of a plate adapted to engage the upper surface of the cheese, a horizontally disposed spring arm on one end of which said plate is mounted, said spring arm being arranged to normally hold said plate in an elevated, disengaging position, a bracket secured to said knife frame with a pair of arms extending rearwardly therefrom, a cam between said arms and means for clamping said cam between said arms whereby said cam will engage said cheese holding arm when the knife frame is moved downwardly.

8. The combination with the frame of a cheese cutter, and a movable cheese table mounted thereon, and a knife frame mounted in connection with the frame of the cheese cutter, of a plate adapted to hold the upper surface of the cheese and horizontally disposed spring arm on one end of which said plate is mounted, said spring arm being arranged to normally hold said plate in an elevated disengaging position, a bracket secured to said knife frame with a pair of rearwardly extending arms and clamping bolt extending through said arms, a cam between said arms on said bolt so it can be clamped in position so as to engage said cheese holding arm, and a projection from said cam for turning it for adjustment.

9. The combination with the frame of a cheese cutter, a rotary cheese table thereon, and a knife frame mounted in connection with the frame of the cheese cutter, of a cheese holding plate and spring arm mounted in connection with the frame of a cheese cutter and in position to be actuated by the knife frame, and bolt screwing through said arm and secured to said plate, and a pin on said plate projecting through a hole in said arm.

In witness whereof, I have hereunto affixed my signature in the presence of the witnesses herein named.

ORANGE O. OZIAS.

Witnesses:
H. M. WALSH,
GEO. W. KEPLER.